United States Patent [19]
Horling et al.

[11] Patent Number: 5,118,159
[45] Date of Patent: Jun. 2, 1992

[54] OPTIMIZED MOMENT CAPACITY NESTABLE DOOR BEAM

[75] Inventors: Timothy J. Horling, Northville; Kieran P. Maloney, Wayland; Robert J. DePierre, Kalamazoo, all of Mich.

[73] Assignee: Benteler Industries, Inc., Grand Rapids, Mich.

[21] Appl. No.: 631,099

[22] Filed: Dec. 19, 1990

[51] Int. Cl.⁵ .............................................. B60R 27/00
[52] U.S. Cl. ..................................... 296/188; 296/146
[58] Field of Search ....................... 296/188, 189, 146; 52/720

[56] References Cited

U.S. PATENT DOCUMENTS

| | | | |
|---|---|---|---|
| 1,821,850 | 9/1931 | Riemenschneider | 52/720 X |
| 4,636,608 | 1/1987 | Palentyn et al. | 219/121 |
| 4,708,390 | 11/1987 | Palentyn et al. | 296/188 |

FOREIGN PATENT DOCUMENTS 270223  11/1988  Japan ................................. 296/188

OTHER PUBLICATIONS

Prior art S curve contour cut door beam per FIG. 4 of the application.

Primary Examiner—Margaret A. Focarino
Assistant Examiner—Gary C. Hoge
Attorney, Agent, or Firm—Price, Heneveld, Cooper, DeWitt & Litton

[57] ABSTRACT

A vehicle door impact beam having an elongated tubular body and contour cut ends, all portions of the contour cut ends having a moment capacity at least equal to the bending moment. Each contour cut end has a sloping central body and a pair of end transitions straddling the body. This body and the transitions are each characterized by special equations.

7 Claims, 2 Drawing Sheets

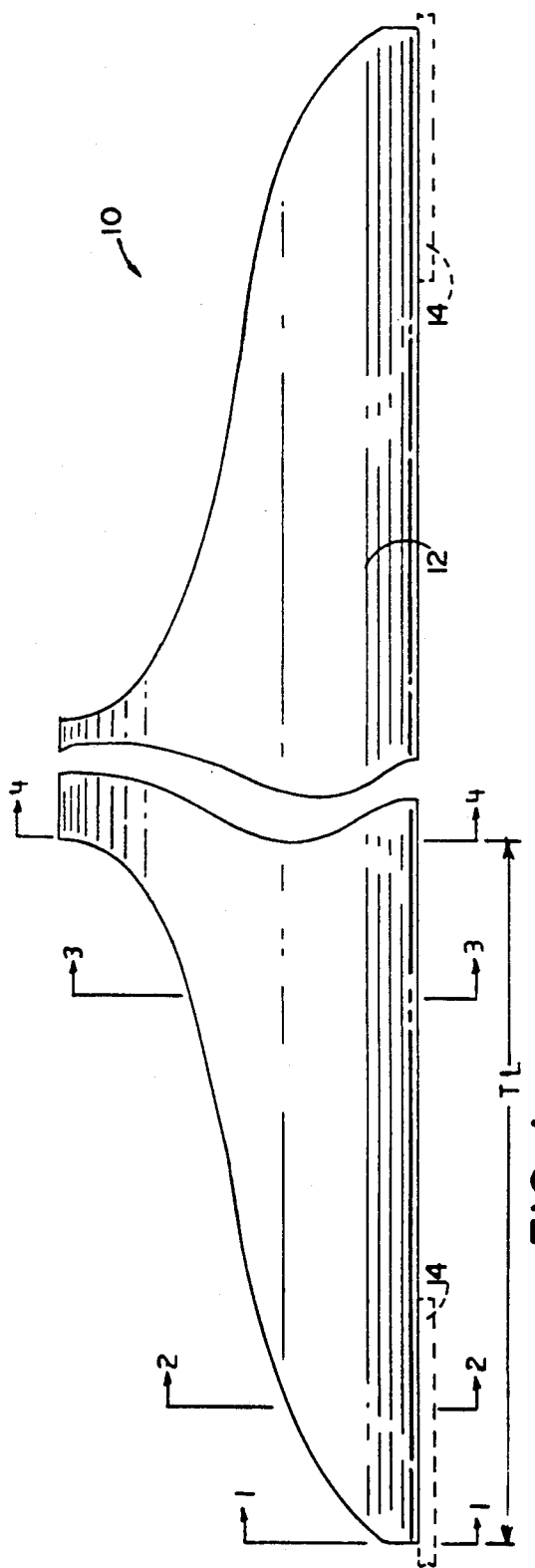
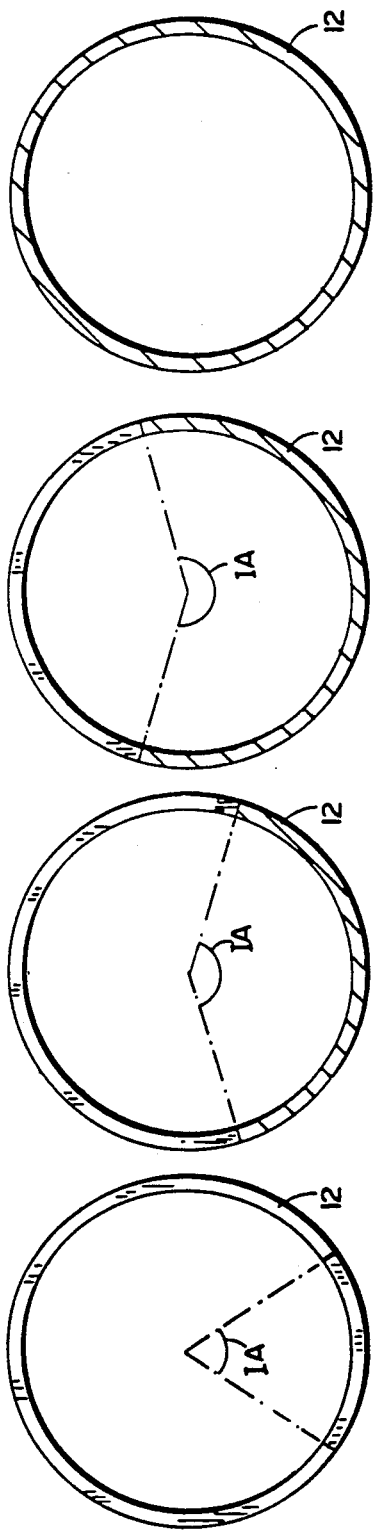

OPTIMIZED MOMENT CAPACITY NESTABLE DOOR BEAM

BACKGROUND OF THE INVENTION

In the early 1970's, the federal government enacted the Federal Motor Vehicle Safety Standard 214 (FMVSS 214) to specify side door strength requirements for vehicles to minimize injury during side collisions. The structural reinforcements added to the door of the vehicles are commonly called impact beams, intrusion beams, guard beams, or door beams. Vehicle impact door beams have been provided in a variety of cross sectional configurations, including I-beam, hat section, and more recently, tubular. Each of these has effectiveness, if properly designed, with the tubular beam considered by the inventors herein to have the following advantages:

1) Shortened development time and cost, since tubing thickness can be readily selected in any of a number of outside diameters, and designs can be fine tuned in the development stage. A significant advantage is that extensions and weld fixtures do not have to be modified to accommodate the various beam configurations.

2) Tubing can be nested by laser cutting to further reduce weight and cost, i.e., cutting of the tube at one location produces two ends of two different tubes.

3) Tubing can be laser cut to clear latch rods, outer panels, etc., i.e., fitting within the door without incurring cost penalties.

4) Tubing has a higher torsional resistance than open hat sections. This becomes particularly important on plastic doors where torsional rigidity is critical.

5) Tubing fits in extensions with semi-cylindrical cavities, conveniently allowing for anchoring extensions to be located in the correct angle without affecting the welding of the tube to the extension. This allows for tighter twist tolerances to be met and is considered essential when mounting extensions such as paddles are not parallel to each other.

6) Extension standardization easily achieved from end to end, and car line to car line, due to the semi-cylindrical tube pocket. Extensions can be rotated into position without changing extension surfaces.

In prior U.S. Pat. Nos. 4,636,608 and 4,708,390 is set forth a tubular door beam structure having specially formed tapered ends. Subsequently, a modified taper configuration as set forth in FIG. 4 was used. The taper cuts on each end of the present tubular beam, a) accommodate the vehicle door curvature while readily allowing the beam to have its ends attached to anchor plates as by welding, b) enable the beams to be nestable, and c) cause the beam to be lighter in weight, among other factors. The length of the taper cut on both ends has in the past been primarily determined by stock length and beam length, in efforts to avoid excess scrap. Performance has been based on door stiffness and strength. Since the greatest moment would be at the center of the beam, this would be expected to be the point at which yielding first occurs. Door strength tests are conducted with a ram loaded at the beam center. Determining the length of the cut by stock length and beam length can lead to excessive taper length, and result in a tendency to fail, i.e., buckle, in the taper itself rather than in the main central portion of the beam. It has now been found that in some portions of prior taper cuts, the moment capacity $M_C$ dips below the bending moment $M_B$ so that the moment ratio $M_R$ is less than one. One way to attempt to prevent this is to make the taper cut considerably shorter. However, this can result in structures having a large excess of capacity at parts of the taper cuts. This excess capacity results in use of additional costly material, with resultant added weight. It has been determined that what is needed is a taper cut with moment capacity in all portions greater than the bending moment, yet eliminating excess capacity. This will streamline the beam and also save on material costs. In other words, it would be desirable to be able to provide an improved version of the basic tubular beam configuration set forth in the prior art wherein there is adequate but not excessive strength in the taper cuts, and also being nestable.

SUMMARY OF THE INVENTION

An object of the present invention, therefore, is to provide a nestable, tubular, impact door beam for a vehicle having tapered ends of special configuration effecting near optimum moment capacity combined with less material cost. The moment capacity at any incremental part of the beam, even along the taper cut ends, is assured to be greater than the bending moment, but not greatly in excess of the bending moment so as to waste material. The moment capacity is controlled in a fashion that the novel beam still has the nestability advantage of prior tubular beams, i.e., two beam ends formed with one cut. The length of the cut, however, can be increased while still providing an effective door beam with adequate moment capacity.

Each taper cut includes a sloped central body and a pair of curvilinear, parabolic end transitions. The included angle of the central body is generally defined as:

$$IA = X/TL\,(L) - Y$$

Where
- IA = included angle at a particular location
- X = slope times total taper length
- TL = total taper length
- L = fraction of total taper length
- Y = the Y axis intercept of the body slope.

The included angle of the central body is preferably defined as:

$$IA = 150/TL\,(L) + 105$$

for $0.2\,TL \geq L \geq 0.8\,TL$.

The included angle of one end transition is generally defined by:

$$IA = Z/TL\sqrt{TL/V}\,(\sqrt{L}) + W$$

Where
- Z = parabola shape
- V = number of segments in the total taper length
- W = parabola intercept with Y axis;

The included angle of this one end transition is preferably defined by:

$$IA = 495/TL\sqrt{(TL/5)}\,\sqrt{L} + 36$$

for $0 \leq L \leq 0.2\,TL$

The included angle of the other end transition is generally defined by:

$$IA = 360 - [Z/TL (\sqrt{TL/Y}) \sqrt{(TL - L)} + W]$$

and is preferably defined by:

$$IA = 360 - [495/TL \sqrt{(TL/5)} \sqrt{(TL - L)} + 36]$$

for $0.8\ TL \leq L \leq TL$

BRIEF DESCRIPTION OF THE DRAWINGS

FIG. 1 is a fragmentary side elevational view of a tubular nestable impact door beam, showing particularly the end portions, and made in accordance with this invention;

FIG. 1A is a view taken on plane 1—1 of FIG. 1;

FIG. 1B is a sectional view taken on plane 2—2 of FIG. 1;

FIG. 1C is a sectional view taken on plane 3—3 of FIG. 1;

FIG. 1D is a sectional view taken on plane 4—4 of FIG. 1;

DESCRIPTION OF THE PREFERRED EMBODIMENT

Referring now specifically to the drawings, the impact beam assembly 10 there depicted typically includes the impact beam 12 itself and a pair of mounting plates 14, shown in phantom, to which the beam is secured as by welding, the mounting plates being secured to the door frame of the vehicle by welding, bolts, or the like, as is desired. Beam 12 is initially of a tubular cylindrical body of high grade steel, e.g., "BTR 110" from Benteler Werke AG, Paderhorn, Federal Republic of Germany. It may be formed as set forth in U.S. Pat. No. 4,210,467, issued Jul. 1, 1980. The tubular beam has a central axis and a wall thickness. Beam 12 also has specially formed and configurated taper cut end portions, according to the invention.

The end extensions or mounting brackets 14 may vary considerably in configuration, depending upon the vehicle model and size into which the structure is to be mounted. These brackets may have stamped recess cavities for receiving the ends of the beam, and appropriate orifices or fasteners to secure them to the door frame. Typical brackets are shown in U.S. Pat. No. 4,708,390, as one example.

The tapered end portions of the beam may be formed by being laser cut while causing relative rotation between the beam and the laser and relative axial movement between the beam and the laser, the laser preferably being oriented directly toward the axis of the beam. A suitable laser source (not shown) can be a 1250 watt carbon dioxide cutting laser, with the laser beam being directed toward the axis of the tubular workpiece by being reflected by mirrors, as explained in U.S. Pat. No. 4,708,390.

Figure 3:
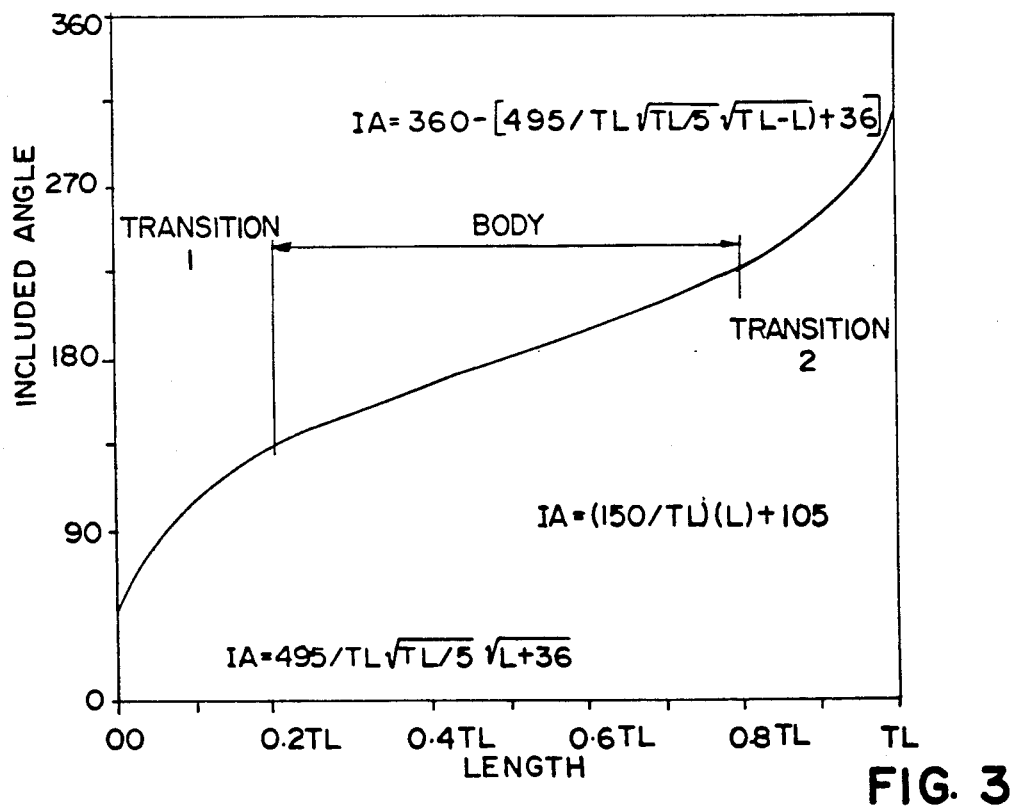
FIG. 3 is a graphic display of taper length versus included angle, showing the mathematical relationship of an optimum taper cut.
Figure 4:
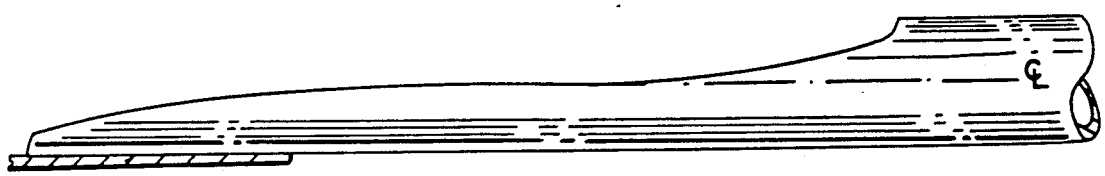
FIG. 4 is a graphic view of a prior art S-curve taper cut.

In the prior tubular beams, it is now realized that the beam could sometimes buckle in the tapered end portions when under impact. The present development involves a special relationship such that the moment capacity is greater than the bending moment over the length of the taper cut, to prevent buckling at the taper cut, but not excessively so, and also allowing the beam to be nestable, i.e., one cut simultaneously forming two ends of two separate beams. Three zones are formed in each taper cut end portion, each according to a particular mathematical relationship. More specifically, each taper cut end portion includes a central, sloped cut body and a pair of end transitions (FIG. 3). One of the end transitions adjacent the central portion of the beam is concavely curved while the other end transition adjacent the outer terminus is convexly curved. In achieving these cuts, the metal tube is cut to cause the wall thickness of the tube to be exposed. Each portion of the exposed wall surface is preferably oriented toward, or almost toward, the axis of the cylindrical tube.

Figure 2:
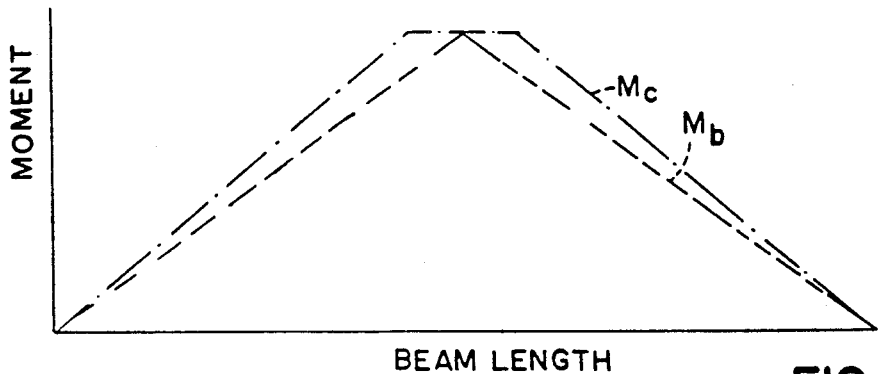
FIG. 2 is a graphical representation of the relationship of beam length versus moment capacity in comparison to bending moment of a near optimum taper cut.

The fragmentary distance along the total cut length TL, at which an evaluation is to be made, is designated L. In the illustrated embodiment, the total taper length TL is divided into fifths, i.e., 0.2 TL lengths. Other fractions could be employed. The total taper length TL is the linear length of the tube over which the cut extends. At any incremental length L along the length TL of the taper cut, there is an included angle (IA) between the two mirror image opposite sides of the cut (see FIGS. 1A-1D). The taper cut has an outer terminus at the end of the beam, and an inner terminus adjacent the central portion of the beam. The beam has a greater peripheral partial circumference adjacent this central portion, and a smaller peripheral partial circumference adjacent the outer terminus. To achieve adequate moment capacity in all portions of the impact beam, including the taper cut end portions, it is important to have the moment capacity $M_C$ at each increment along the length of the beam greater than the bending moment $M_B$ (FIG. 2) so that impact will cause the beam to buckle at the center of the beam rather than at the taper cut end portions. Thus, as depicted in FIG. 2, the moment capacity $M_C$ is greater at all points along the beam than the bending moment $M_B$, i.e., the moment ratio $M_R$ of $M_C$ divided by $M_B$ is equal to or greater than one. It is also important to have the beam be nestable, i.e., two beam ends cut with the same taper cut. The included angle should not be greater than a certain amount if nestable character is to be achieved. This is achieved using special relationships for the configuration of the body portion and the two transition portions of each taper cut, these being defined in terms of the included angle IA as set forth below. The slope of the body portion is linear, or close thereto. The two transitions are parabolic, or close thereto. The included angle of this body portion is generally defined by:

$$IA = X/TL\ (L) + Y$$

Where
IA = included angle at a particular location
X = slope times total taper length
TL = total taper length
L = fraction of total taper length at the particular location
Y = the Y axis intercept of the body slope.

The included angle of the central body is preferably defined as:

$$IA = 150/TL\ (L) + 105;$$

for $0.2\ TL \geq L \geq 0.8\ TL$

The included angle of one end transition is generally defined by:

$$IA = Z/TL \sqrt{TL/V} (\sqrt{L}) + W$$

Where
Z = parabola shape
V = number of segments in the total taper length
W = parabola intercept with Y axis.

The included angle of this one end transition is preferably defined by:

$$IA = 495/TL \sqrt{(TL/5)} \sqrt{L} + 36$$

for $0 \leq L \leq 0.2\ TL$

The included angle of the other end transition is generally defined by:

$$IA = 360 - [Z/TL (\sqrt{TL/V}) \sqrt{(TL - L)} + W]$$

and is preferably defined by:

$$IA = 360 - [495/TL \sqrt{(TL/5)} \sqrt{(TL - L)} + 36]$$

for $0.8\ TL \leq L \leq TL$

The resulting tubular beam is at or near optimum beam capacity over its length, including its taper cut ends, and it nestable.

Conceivably those skilled in this art may conceive of variations on the concept set forth. It is not intended that the invention should be limited by the specific illustrative and preferred embodiments set forth, but only by the scope of the appended claims and reasonably equivalent structures and methods to those defined therein.

The embodiments of the invention in which an exclusive property of privilege is claimed are defined as follows:

1. A vehicle door impact beam comprising:
    an elongated tubular body having a wall thickness, and comprising a central portion, and two end portions;
    each said end portion of said body being taper cut along its length in a manner to cause said wall thickness to be exposed to form a pair of mirror image wall edge surfaces;
    each said end portion having an outer terminus and having a greater peripheral partial circumference with an included angle greater than 180 degrees adjacent said central portion and a smaller peripheral partial circumference with an included angle less than 180 degrees adjacent said terminus;
    said beam having means comprising a predetermined partial circumference with an included angle sufficient at all positions along the length of said tapered end portions for achieving a moment capacity at all said positions, greater that the bending moment at said positions;
    each said tapered end portion having a sloped central body and a pair of parabolic, body straddling transitions, one toward said outer terminus and the other toward said central portion;
    said wall surfaces of said one parabolic transition having a convex curvilinear parabolic configuration, and said wall surfaces of said other parabolic transition having a concave curvilinear parabolic configuration.

2. The vehicle door impact beam in claim 1 wherein said central body is characterized by the equation:

$$IA = (150/TL) (L) + 105$$

for $0.2\ TL \leq L \leq 0.8\ TL$

IA = included angle (degrees)
TL = taper length
L = fraction of total taper length.

3. The vehicle door impact beam in claim 2 wherein one said end transition is characterized by the equation:

$$IA = 495/TL \sqrt{(TL/5)} \sqrt{L} + 36$$

for $0 \leq L \leq 0.2\ TL$
and the other end transition is characterized by the equation:

$$IA = 360 - [495/TL (\sqrt{TL/5}) \sqrt{(TL - L)} + 36]$$

for $0.8\ TL \leq L \leq TL$.

4. The vehicle door impact beam of claim 1 wherein said one transition and said other transition are of like parabolic curves.

5. The vehicle door impact beam of claim 1 wherein said body is characterized as follows:

$$IA = X/TL (L) - Y$$

where
IA = included angle
X = incline of said body
TL = total length of taper cut
L = the fractional length along the total taper cut
Y = Y axis intercept of the body.

6. The vehicle door impact beam of claim 5 wherein said one parabolic curve transition is characterized as follows:

$$IA = Z/TL (\sqrt{TL/V}) (\sqrt{L}) + W$$

and said other parabolic curve transition is characterized as follows:

$$IA = 360 - [Z/TL (\sqrt{TL/V}) \sqrt{(TL - L)} + W]$$

where
Z = parabola shape
W = Y intercept of parabola.

7. The vehicle door impact beam of claim 4 wherein said body is characterized as follows:

$$IA = X/TL (L) + Y$$

where

IA = included angle

X = incline of said body

TL = total length of taper cut

L = the fractional length along the total taper cut

Y = Y axis intercept of the body;

said one parabolic curve transition is characterized as follows:

$$IA = Z/TL (\sqrt{TL/Y})(\sqrt{L}) - W$$

and said other parabolic curve transition is characterized as follows:

$$IA = 360 - [Z/TL (\sqrt{TL/Y}) \sqrt{(TL - L)} - W]$$

where
Z = shape of parabola
W = Y axis intercept of parabola.

* * * * *